No. 750,629. PATENTED JAN. 26, 1904.
J. FAY.
INSTRUMENT FOR DETERMINING THE POSITION OF CUTTERS ON MOLDING CUTTER HEADS.
APPLICATION FILED APR. 9, 1903.
NO MODEL. 2 SHEETS—SHEET 1.

WITNESSES:
J. A. Brophy
H. J. Bernhard

INVENTOR
John Fay
BY Munn
ATTORNEYS.

THE NORRIS PETERS CO., PHOTO-LITHO., WASHINGTON, D. C.

No. 750,629. PATENTED JAN. 26, 1904.
J. FAY.
INSTRUMENT FOR DETERMINING THE POSITION OF CUTTERS ON MOLDING CUTTER HEADS.
APPLICATION FILED APR. 9, 1903.
NO MODEL. 2 SHEETS—SHEET 2.
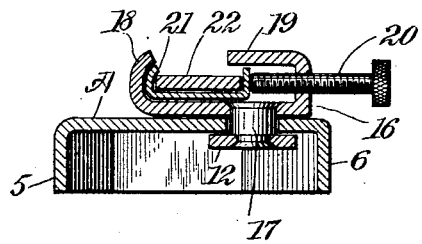
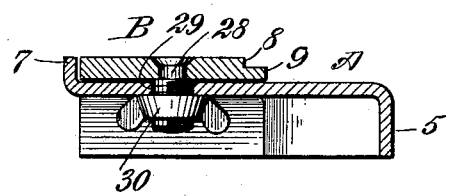
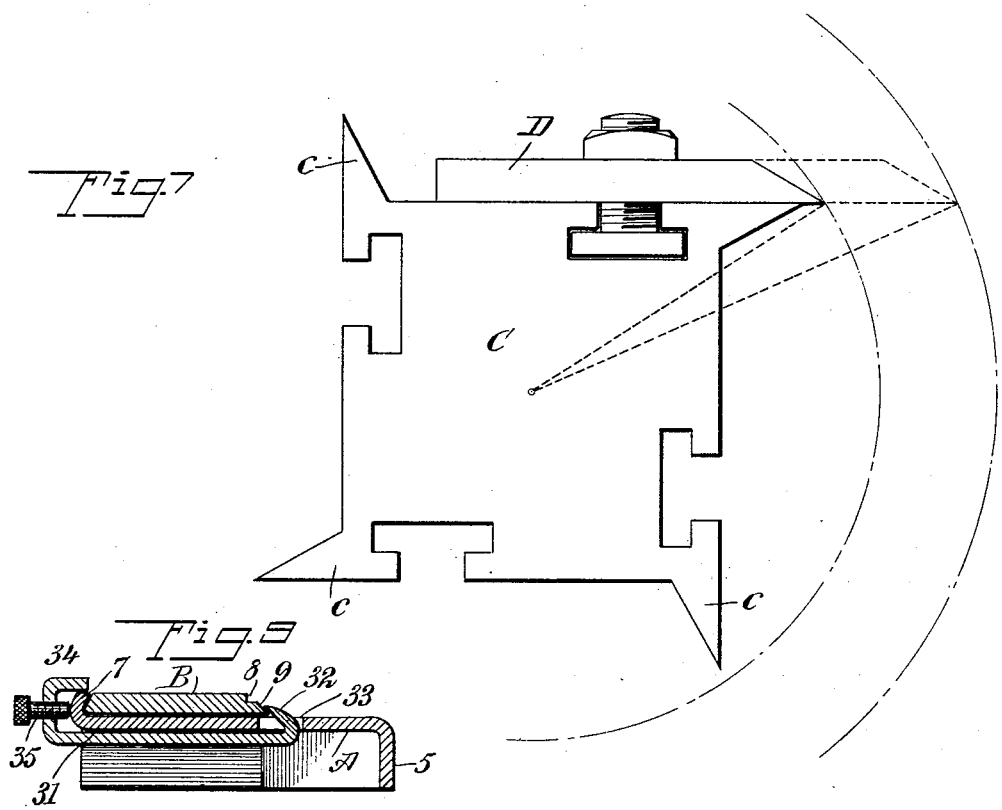
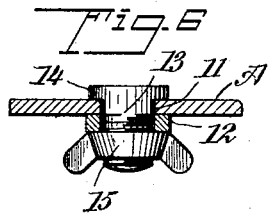
WITNESSES:
J. A. Brophy
H. J. Bernhard
INVENTOR
John Fay
BY Munn & Co.
ATTORNEYS.

No. 750,629. Patented January 26, 1904.

UNITED STATES PATENT OFFICE.

JOHN FAY, OF JERSEY CITY, NEW JERSEY.

INSTRUMENT FOR DETERMINING THE POSITION OF CUTTERS ON MOLDING CUTTER-HEADS.

SPECIFICATION forming part of Letters Patent No. 750,629, dated January 26, 1904.

Application filed April 9, 1903. Serial No. 151,755. (No model.)

*To all whom it may concern:*

Be it known that I, JOHN FAY, a citizen of the United States, and a resident of Jersey City, in the county of Hudson and State of New Jersey, have invented a new and Improved Instrument for Determining the Position of Cutters on Molding Cutter-Heads, of which the following is a full, clear, and exact description.

My invention relates to an instrument for determining the position of knives or cutters on the cutter-heads of wood molding or planing machines, and the object that I have in view is the provision of a simple and compact device which may be used advantageously in ascertaining the extent or distance that any kind of a knife or cutter should project from a cutter-head of any style or pattern known to the art.

The instrument comprises a body having two of the edges thereof at an angle to each other, a rule adjustably confined on the body, a clip slidably held on said body, a channeled bar mounted on the clip, and a graduated slide fitted in the channeled bar.

The invention further consists in the novel construction and combination of parts to be hereinafter described, and the actual scope of the invention will be defined by the claims.

Reference is to be had to the accompanying drawings, forming a part of this specification, in which similar characters of reference indicate corresponding parts in all the figures.

Figure 1:
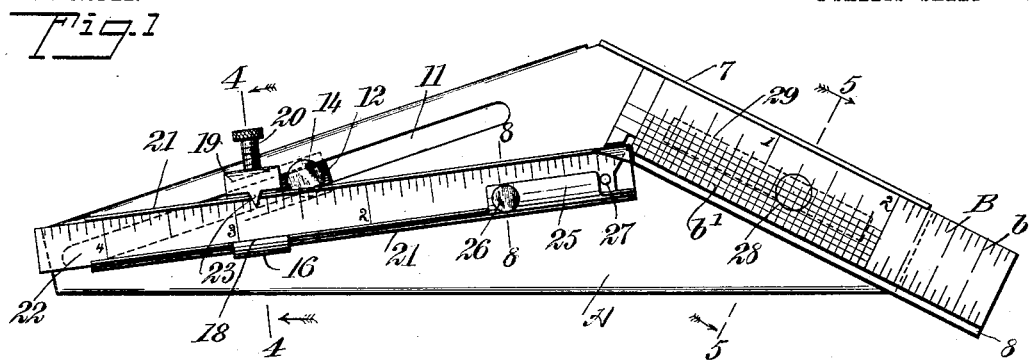
Figure 2:
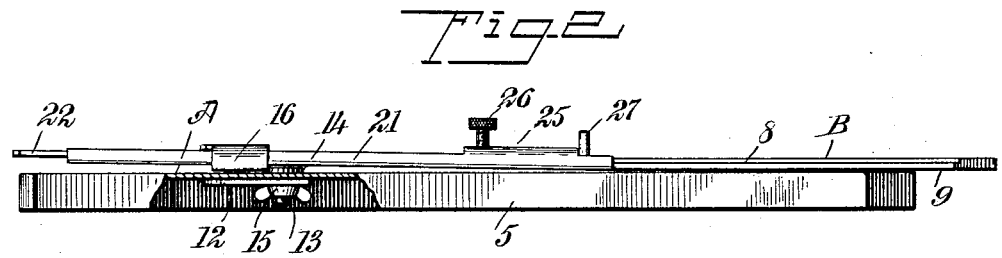
Figure 3:
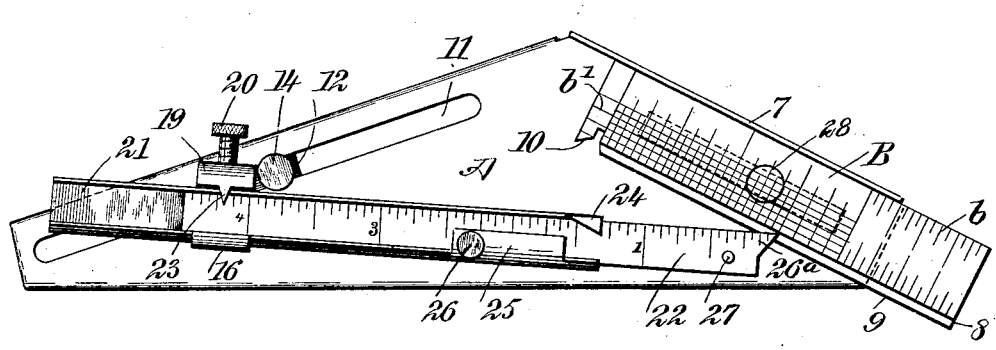
Figure 4:
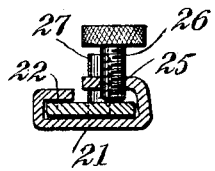
Figure 4:

Figure 1 is a plan view of an instrument embodying my invention. Fig. 2 is an elevation looking at the longest side of the instrument, a part of the flange being broken away. Fig. 3 is a plan view similar to Fig. 1 and showing an adjustment of the channeled bar and of the slide which is carried thereby. Fig. 4 is a vertical section on the line 4 4 of Fig. 1. Fig. 5 is another vertical section on the line 5 5 of Fig. 1. Fig. 6 is a detail cross-section through certain of the parts. Fig. 7 is a view in elevation of one style of cutter-head having a knife applied thereto. Fig. 8 is a cross-section on the line 8 8 of Fig. 1; and Fig. 9 is a cross-section through the instrument, illustrating a preferred form of the clamp for holding the adjustable rule fixedly in a predetermined position.

A designates the body of an instrument embodying my invention, said body consisting of a flat three-cornered plate. On its longest straight side this plate is doubled or bent to form a depending flange 5, and one of the short inclined sides of this plate is bent to form another depending flange 6, said flanges serving to reinforce the plate and prevent bending thereof, so that the plate will retain its proper shape without buckling. The remaining short side edge of the plate is turned or bent in an upward direction to produce an upstanding guide-flange 7, with which is adapted to engage an edge portion of a shiftable rule B, the latter being made from a single piece of metal. (See Figs. 1 and 3.) This rule is provided on its upper face with a plurality of graduations indicating inches and fractions thereof, as at $b$, said graduations extending across the rule, and this rule is furthermore provided with graduations $b'$, which extend longitudinally thereof, the graduations $b'$ indicating fractions of inches, preferable in sixteenths, and lying at right angles to the graduations $b$. The inner edge of the rule is reduced in thickness to form a longitudinal recess 8 and a lip 9, (see Figs. 1, 3, and 5,) and the rule at the inner corner thereof is provided with a notch 10.

The body portion is provided adjacent to the downturned flange 6 with a longitudinal slot 11, and against the under side of the body portion is fitted a slidable plate 12, the latter underlapping said slot 11, the length of the plate 12 being considerably less than the length of the slot. This plate is provided with a screw-bolt 13, which passes through said slot in the body A and the plate 12, the head 14 of said bolt resting on the upper face of the body A, while the lower threaded part of the bolt receives a winged thumb-nut 15, the latter being adapted to bind against the plate 12 and to clamp it firmly in an adjusted position on the under side of the body. The adjustable plate 12 carries a clip 16, which is connected pivotally to said plate by a stud, rivet, or its equivalent, (indicated at 17 in Fig. 4 of the drawings,) whereby the clip has permanent connection in a pivotal manner with the plate 12, that is adapted to be clamped against the body. This clip is provided at one end with an upturned flange 18 and at its other end with an overhanging flange 19, said overhanging flange supporting a clamping-screw 20, which is adapted to hold a channeled bar 21 adjustably within the pivoted clip. This bar 21 is fitted within the pivoted clip so as to lie between the flange 18 thereof and the binding-screw 20, said bar being slidable longitudinally through the clip to different positions. The bar is provided in its upper face with a longitudinal channel which is adapted to receive a slide or graduated bar 22, and this slide or bar is capable of adjustment with the channeled bar and the pivoted clip, while it is also capable of an endwise movement irrespective of the pivotal movement of the bar 21 with said clip.

The slide or bar 22 is provided on its upper exposed face with a series of graduations denoting inches and fractions thereof, and the overhanging flange 19 of the clip is provided with a pointer 23, which is adapted to indicate the position of the working edge on surface cutters. The channeled bar 21 is provided at one end with an overhanging guide lip or corner 24, which is adapted to fit in the notch 10 of the graduated rule to indicate the distance that the graduated bar 22 is projected for the depth of the cut, as in Fig. 3. In the example shown by this figure the cut is one and five-sixteenths inches, as shown by slide 22, and the length of the cutter is one and one-half inches, as shown by rule B. This bar 21 is furthermore provided with an overhanging flange 25, in which is mounted a binding-screw 26, the latter being adapted for engagement with the graduated bar 22 for the purpose of clamping it firmly against the bottom of the channeled bar. This graduated bar is cut or recessed to form at its free end a finger 26ª, and said bar is also provided with an upstanding stud 27, which serves two purposes—first, as a means for limiting the inward movement of the graduated bar 22 within the channeled bar 21 by engaging with the end of the overhanging flange 25, and, second, it serves as a finger-piece for the convenient manipulation of the graduated bar.

The rule B may be clamped adjustably to the body A in any suitable way. In one embodiment of this part of the invention the rule B is provided with a depending stud 28, adapted to pass through an inclined slot 29 formed in the body A, as indicated by dotted lines in Fig. 1, the position of the slot being also shown by Fig. 5. The lower threaded part of the stud 28 receives a winged clamping-nut 30, which may be tightened against the under side of the body and serve to draw the rule B into tight frictional engagement therewith, whereby the rule may have an endwise adjustment, owing to the threaded stud sliding in the slot 29. Normally the rule B is drawn inwardly in an inclined direction for its outer end to lie flush with one of the angular corners of the body; but by loosening the nut 30 the rule and its stud may be adjusted to any desired position within the limit of the length of said rule, after which the nut 30 should be retightened.

Another means for adjustably clamping the rule to the body is represented by Fig. 9, wherein I employ a stationary bent clamp 31. This clamp is provided at one end with a hook or jaw 32, adapted to pass through an opening 33, which is provided in the body A, said jaw being adapted for engagement with the beveled edge on the lip 9 of the rule. The clamp 31 lies partly below the body A, transversely across the same, and at its other end it is turned upwardly and then inwardly to produce the overhanging flange 34, said flange being equipped with the binding-screw 35, which is adapted to work against the flange 7 of the body. (See Fig. 9.) It is evident that the screw 35 may be released to slacken the engagement between the body and the rule, thus permitting said rule to be adjusted to the desired position, after which the screw 35 should be manipulated to again tighten the clamp into frictional engagement with the body and said rule.

In Fig. 7 of the drawings I have illustrated one of the many forms of cutter-heads in common use on woodworking molding-machines, said cutter-heads being adapted for the reception of suitable knives or blades, which vary in size and in shape. As shown, however, the cutter-head C is provided at each of its angles or corners with a lip $c$, and against each face of this cutter-head is secured a cutter D, said cutter having overlapping relation to the lip $c$.

The operator uses the instrument by setting the channeled bar 21 to describe the radius of the cutter D, as shown by Fig. 7, which represents the surface cut or working edge. The operator first ascertains the distance that the lip $c$ and the cutter D extend beyond the cutter-head, as in Fig. 7, and the rule B is then adjusted for its outer end to project a corresponding distance beyond the angular corner of the body A. The adjustable plate 12 is now shifted in the slot 11 of the body and the channeled bar 21 is moved in the pivoted clip until the lip 24 of said bar will fit in the notch 10 of the rule, after which the nut 15 and the screw 20 are tightened to hold the slide 12 against movement and to prevent the channeled bar 21 from having further endwise movement within the clip, although said clip and the channeled bar are free to turn on the axis afforded by the stud 17. The adjustment of the channeled bar indicates the radius of the circle described by the active edge of the cutter D, and the extent of projection of the cutter is ascertained by adjusting the graduated bar 22 within the channeled bar 21, the finger 26ᵃ of said graduated bar being brought opposite the proper transverse graduation b of the rule. The parts having been adjusted in the manner described and represented by Fig. 3, the operator proceeds to mark the proper indications on a wooden gage block or strip commonly used by operators when adjusting the cutters D on a cutter-head, and the use of this gage having measurements determined by my improved instrument allows the cutters to be accurately adjusted on the cutter-head. As this gage-block is a common feature known to those skilled in the art, I have not considered it necessary to illustrate or describe the same herein; but the common gage-block is made of wood, so that the marks inscribed thereon by a pencil may be readily effaced, thus allowing the gage-block to be used a number of times.

The longitudinal graduations $b'$ on the rule B are used for indicating the adjustment of the graduated bar 22 when it is desired to determine the degree of projection of a channeled or irregular molding-cutter which is the equivalent for the cutter D, and in this use of the rule B the finger 26ᵃ of the graduated bar is arranged to traverse the scale formed by the longitudinal graduations $b'$ on said rule. The bar 22 is moved out one inch or so and fastened by the screw 26, and the channel 21 is then moved so that the bar 22 will have the same radius as before, as indicated by the pointer 23, and then the bar 22 is swung over the rule B to the required line. The clip 16 is capable of a certain amount of lost play relative to the body, so that the end portion of the graduated bar 22 may overlap the rule.

Having thus described my invention, I claim as new and desire to secure by Letters Patent—

1. An instrument of the class described, comprising a body having two guideways inclined oppositely to each other, a graduated rule confined slidably by one guideway for movement on the body, a pivoted clip slidably confined in the other guideway, a graduated bar mounted on said clip for pivotal movement and slidable with the clip on the body, said bar being shiftable into variable and operative relations to said rule, and means for individually holding said rule and the bar in place.

2. An instrument of the class described, comprising a body provided with two guideways inclined reversely to each other, a graduated rule confined by one guideway for slidable movement on the body, a pivotal clip fitted slidably to the other guideway of the body for adjustment toward and from the rule, and a graduated bar fitted slidably to said clip for adjustment therewith and for independent movement thereon, said graduated bar being movable to various positions in coöperative relation to the rule.

3. An instrument of the class described, having a body, a rule fastened adjustably thereto, a clip pivotally supported on the body, a guide-bar held in said clip and shiftable into engagement with said rule, and a graduated bar supported by the guide-bar and adjustable to variable positions relative to the rule.

4. An instrument of the class described, having a body, an adjustable rule thereon, a clip pivotally supported on the body, a channeled guide-bar adjustable in said clip for movement therewith and shiftable into engagement with the rule, and a graduated bar held adjustably in said guide-bar and shiftable to variable positions relative to the rule.

5. An instrument of the class described, having a body, an adjustable rule thereon provided with a notch, a guide-bar shiftable on said body into and from engagement with said notch of the rule, and a graduated bar held adjustably in the guide-bar and movable to different positions relative to the rule.

6. An instrument of the class described, having a body, a pivoted clip, a rule adjustable on said body, a channeled guide-bar mounted for endwise movement in said clip, and a graduated bar fitted for endwise movement in the channeled bar and shiftable to different positions along the edge of the rule or over the face thereof.

7. An instrument of the class described, having a body, a graduated rule shiftable thereon, a clamp for holding said rule to variable predetermined positions on said body, a guide-bar adjustable into engagement with the rule and movable relatively thereto, and a graduated bar carried by said guide-bar.

8. An instrument of the class described, comprising a slotted body, a rule adjustable thereon, a clip having pivotal and adjustable connection with said slotted body, a channeled bar in said clip, and a graduated bar carried by the channeled bar and shiftable relatively to the rule.

9. An instrument of the class described, having a body, an adjustable rule thereon, a pivoted and adjustable clip provided with an index or pointer, a channeled bar clamped in said clip, and a graduated bar clamped adjustably in the channeled bar and shiftable relatively to the rule.

In testimony whereof I have signed my name to this specification in the presence of two subscribing witnesses.

JOHN FAY.

Witnesses:
GEORGE W. WHITING,
MARY T. RICE.